(12) United States Patent
Auer et al.

(10) Patent No.: US 12,736,422 B2
(45) Date of Patent: Sep. 15, 2026

(54) SENSOR DEVICE

(71) Applicant: DR. JOHANNES HEIDENHAIN GmbH, Traunreut (DE)

(72) Inventors: Daniel Auer, Traunstein (DE); Matthias Eckart, Anger (DE)

(73) Assignee: DR. JOHANNES HEIDENHAIN GMBH, Traunreut (DE)

(*) Notice: Subject to any disclaimer, the term of this patent is extended or adjusted under 35 U.S.C. 154(b) by 294 days.

(21) Appl. No.: 18/617,715

(22) Filed: Mar. 27, 2024

(65) Prior Publication Data

US 2024/0337547 A1 Oct. 10, 2024

(30) Foreign Application Priority Data

Apr. 4, 2023 (EP) .................................... 23166482

(51) Int. Cl.
*G01L 3/10* (2006.01)

(52) U.S. Cl.
CPC .................................... *G01L 3/108* (2013.01)

(58) Field of Classification Search
CPC ... G01L 1/2231; G01L 1/2268; G01L 1/2287; G01L 3/108; G01L 3/1457; G01L 5/1627
See application file for complete search history.

(56) References Cited

U.S. PATENT DOCUMENTS 6,962,088 B2 * 11/2005 Horiuchi ............... F16H 49/001
73/862.338
11,740,105 B2 * 8/2023 Ocket .................. G01D 5/2006
324/207.16
12,000,745 B2 * 6/2024 Vignolles ................ G01L 5/226
12,025,474 B2 * 7/2024 Auer .................... G01D 5/2053
12,196,306 B2 * 1/2025 Takagi .................. G01L 3/1457
12,216,012 B2 * 2/2025 Takagi .................. G01L 1/2287
12,228,466 B2 * 2/2025 Takagi ................... B25J 13/085
2004/0079174 A1 * 4/2004 Horiuchi ............... G01L 3/1457
73/862.338

(Continued)

FOREIGN PATENT DOCUMENTS

DE 102022206333 A1 12/2022
JP 2004-198400 A 7/2004

(Continued)

OTHER PUBLICATIONS

European Search Report issued in EP Patent Application No. 23166482, dated Sep. 12, 2023, pp. 1-3.

*Primary Examiner* — John Fitzgerald
(74) *Attorney, Agent, or Firm* — Carter, DeLuca & Farrell LLP

(57) ABSTRACT

A sensor device for torque measurement includes a substrate, a first conductor track, and a second conductor track. The first conductor track and the second conductor track are arranged on the substrate, and each of the first conductor track and the second conductor track includes at least one region having meander-shaped structures. The structures of the first conductor track and the structures of the second conductor track are each continuously connected to each other via connecting sections. The structures make it possible to determine the torque load on the substrate. The structures of the first conductor track and the structures of the second conductor track extend in an alternating manner along a curve.

22 Claims, 3 Drawing Sheets

(56) References Cited

U.S. PATENT DOCUMENTS

| | | | | |
|---|---|---|---|---|
| 2019/0275681 | A1* | 9/2019 | Böhme | B25J 13/085 |
| 2020/0200569 | A1* | 6/2020 | Utermoehlen | G01D 5/204 |
| 2021/0325267 | A1* | 10/2021 | Vignolles | B25J 13/085 |
| 2022/0214237 | A1* | 7/2022 | Gierl | G01L 3/108 |
| 2022/0236125 | A1* | 7/2022 | Xu | G01L 3/108 |
| 2022/0412819 | A1* | 12/2022 | Takagi | G01L 5/22 |

FOREIGN PATENT DOCUMENTS

| | | | | |
|---|---|---|---|---|
| JP | 2020-201046 | A | 12/2020 | |
| JP | 2021-096105 | A | 6/2021 | |
| WO | WO-2021052651 | A1 * | 3/2021 | G01L 3/145 |

* cited by examiner

SENSOR DEVICE

CROSS-REFERENCE TO RELATED APPLICATIONS

The present application claims priority to application Ser. No. 23/166,482.2, filed in the European Patent Office on Apr. 4, 2023, which is expressly incorporated herein in its entirety by reference thereto.

FIELD OF THE INVENTION

The present invention relates to a sensor device, e.g., for determining a torque load. The sensor device described herein may, for example, be adapted to determine the torque load on a machine part. More specifically, the sensor device may be used, for example, as measuring devices to determine the torque load on machine parts in robot joints. For example, the measured torque values may be fed to downstream electronics via a corresponding interface arrangement.

BACKGROUND INFORMATION

In certain conventional systems, sensor devices in the form of strain gages are glued directly to a measured object. In this regard, the change in electrical resistance is measured, which is predominantly a purely geometric result of a change in length due to stretching. In order to achieve a measurable effect, the strain gages are usually meander-shaped, flexible, thin metal lines. Although strain gages can be used in a variety of manners, they have the decisive disadvantage that they are not configured to be structure-specific, which means that the measurement result is achieved with only insufficient accuracy. In addition, strain gages are usually glued to the measured object by hand, which means that the main stress directions of the measured object are usually not optimally aligned therewith. When the strain gages are glued to the measured object, signs of aging of the adhesive can also have a negative effect on the measurement result.

Japanese Patent Document No. 2020-201046 describes a torque sensor that detects the torque exerted on a body. The torque sensor includes a substrate with a first conductor layer and a second conductor layer, having several resistance wire patterns. The resistance wire patterns of the first and second conductor layers each include a separate and homogeneous circular ring pattern in which a plurality of resistance wires is arranged in the circumferential direction and is connected in series. This arrangement has the considerable disadvantage that thermal effects and parasitic forces can have a negative impact on the measurement result.

SUMMARY

Example embodiments of the present invention provide a comparatively simple sensor device that provides for torque to be measured with relatively high accuracy.

According to an example embodiment of the present invention, a sensor device for torque measurement includes a substrate, a first conductor track, and a second conductor track. The first conductor track and the second conductor track are arranged on the substrate, and each includes at least one region with structures, which are meander-shaped. The structures of the first conductor track and the structures of the second conductor track are each continuously connected to each other via connecting sections, which are arranged as conductor track sections. In this manner, the torque load on the substrate can be determined by the sensor device. The structures of the first conductor track and the structures of the second conductor track are arranged such that they extend in an alternating manner along a curve.

A sensor device may be arranged as a passive sensor device that includes passive sensors or passive components whose parameters are changed by the torque load. These parameters are converted into electrical signals, e.g., within the sensor device, by electronic components. For the operation of the sensor device, an auxiliary energy supplied from outside, e.g., in the form of electrical energy, is required. For example, the electrical resistance or the electrical resistances of the first and second conductor track can serve as a parameter. In order to be able to measure the electrical resistance or a change in resistance, an electric current must flow through the sensor arrangement—e.g., the structures of the first and second conductor track—so that the sensor device must therefore be supplied with electrical energy from outside during operation. For example, the structures of the first and second conductor track react to a torque load by changes in length or cross-section, which has an effect on the electrical resistance of the first and second conductor track.

The torque to be measured may be a torsional torque, for example.

For example, a substrate is a component that is arranged in the form of a circular disk or a circular ring, includes a metallic material, such as steel, and has an insulating layer on one surface.

A curve, for example, in the mathematical sense, extends primarily along a longitudinal or circumferential direction of the substrate.

A structure, for example, includes at least one section of the first conductor track or the second conductor track that has a meander-shaped path with a plurality of loops aligned in parallel. A plurality of structures of one and the same conductor track are connected to each other without interruption by connecting sections. The structures of the first and second conductor track may be arranged in a heterogeneous alternating manner by arranging a plurality of structures in the longitudinal or circumferential direction and connecting them in series.

An alternating path, for example, includes an alternation between the structures of the first conductor track and the structures of the second conductor track along the curve, in which at least one structure of the first conductor track follows a structure of the second conductor track.

For example, the sensor device is arranged such that the curve is guided on an outgoing path without interruption and at least in sections along a first circular line and on a returning path to its origin at least in sections along a second circular line.

The first circular line and the second circular line are arranged concentrically, and both have an identical center but different radii.

An uninterrupted outgoing and returning path, for example, includes a continuous and contiguous path of the first conductor track or the second conductor track from its origin along the substrate and back to the origin, in which the path is characterized by the absence of branches, crossings, or interruptions.

The origin of the curve is, for example, the starting point of the path of the curve. The origin is therefore the starting point or the end point of the first or second conductor track. The first or second conductor track is connected to an electronic component at this point, for example. A center tap may be provided between the first and second conductor track at the origin.

For example, the first circular line and the second circular line each extend concentrically to a center point and in a circumferential direction of the substrate.

The substrate may be rotatable relative about an axis that extends through the center point, and additionally or alternatively may be warpable in the circumferential direction.

Warpable means, for example, that an elastic body—e.g., the substrate—is deformed by a torque and thus assumes a (reversible) warped or twisted state.

The axis, which extends through the center point, also extends orthogonally to the sensor device, e.g., to the first or second circular line or to the substrate.

For example, the sensor device is configured such that the structures of the first conductor track and the structures of the second conductor track are arranged symmetrically to each other.

On the one hand, the foregoing refers to symmetry with regard to adjacent structures along the curve, e.g., in curve sections that are arranged on the first circular line or the second circular line—for example, in the form of axial or mirror symmetry. Alternatively or additionally, point symmetry may also be present. For example, two adjacent structures in the section of the first circular line of the curve and two adjacent structures in the section of the second circular line of the curve are point-symmetrical to each other, and the pair in the first section of the first circular line and the pair in the section of the second circular line are also symmetrical to each other. Thus, the point symmetry refers, for example, to a point that is radially centered between the first circular line and the second circular line.

For example, the structures of the sensor device are arranged such that four adjacent structures are located within a circular sector of the sensor device. The four adjacent structures include two structures of the first conductor track and two structures of the second conductor track, in which the four adjacent structures together form an X-shaped or diamond-shaped formation.

A circular sector is, for example, the smaller partial area of a circular or annular disk—e.g., with regard to the substrate—which partial area is defined by a circular arc, two circular radii, and a center point angle. The sensor device may have one or more circular sector(s), in which four sensor structures are arranged within each circular sector. If several circular sectors are formed on the substrate, these can either be equally or randomly distributed over the 360° of the circular or annular disk.

A formation is, for example, a geometric arrangement of four adjacent structures. The four adjacent structures are located in a circular sector, and these four structures are each made up of a structure of the first and second conductor track, on respectively the first and second circular line. For example, structures of the same conductor track can be located diagonally opposite each other.

The formation can be configured such that it is similar, for example, to the 24th letter "X" of the modern Latin alphabet or a geometric rhombus ("< >").

For example, the second conductor track is arranged such way that it encloses the first conductor track.

An enclosing arrangement, for example, means that the path of the second conductor track configured such that the first and second conductor tracks are located in one plane or in one layer on the substrate, and the first conductor track is always surrounded on at least two sides by the second conductor track or its structures and connecting sections. Additionally, the first and second conductor track do not intersect, cross, or touch each other.

The connecting sections of the first conductor track and the connecting sections of the second conductor track are approximately the same length and have approximately the same resistance.

For example, the sensor device is configured such that the first conductor track and the second conductor track are additively applied to the substrate.

In the course of manufacturing such an additive structure, layers are applied to the substrate over a large area or in a structured manner (e.g., using a lift-off method). This is achieved, for example, through a chemical reaction or through the condensation of gaseous substances onto the surface of the substrate. Alternatively, the additive structure can also be produced by deposition from a liquid phase. For example, additive structure does not include gluing the conductor tracks to the substrate.

For example, the sensor device is arranged such that the substrate includes at least one first structure, e.g., at least one bore, for introducing a torque load and, additionally or alternatively, at least one second structure, e.g., at least one tooth, for releasing a torque load.

The structure for introducing or releasing a torque load may be provided in the form of a mechanically acting or usable configuration of the substrate, for example, in the form of one or more bores. Alternatively or additionally, the structure may be provided in the form of evenly or unevenly distributed teeth, prongs, or tines. These may, for example, be attached to an outer or inner circumference of the circular or annular disk, and they may either protrude outwardly or inwardly (e.g., similar to a gear wheel) or may be attached to the surface of the circular or annular disk at an angle.

The sensor device is, for example, configured such that the torque load can be determined by determining the resistance of the first conductor track and additionally or alternatively of the second conductor track.

For example, the first conductor track and the second conductor track each include an identical number of structures, in which these are connected according to a bridge circuit.

For example, a half-bridge may be implemented, for example, which determines the change in the resistance difference via a change in voltage.

For example, at least one electronic component is arranged on the substrate, via which signals that can be generated by the first conductor track and additionally or alternatively by the second conductor track can be further processed. For example, further processing may be carried out using electronic components for signal amplification and/or signal digitization.

For example, the substrate is made of metal—e.g., steel—and the conductor tracks are made of metal—e.g., aluminum, copper, constantan, or a NiCr alloy.

For example, the substrate and the conductor tracks are made of different metals. For example, the substrate may be made of steel, and the first conductor track and the second conductor track may be made of copper.

For example, the structures each have a plurality of sections in which the corresponding conductor track extends straight or curved in parallel.

For example, the radius of curvature of the conductor tracks in the sections varies depending on the distance from the axis. For example, the radius of curvature increases with increasing distance from the axis.

The structures in the sections may intersect the circular lines at the same angle, which circular lines may have different radii but whose center point is located on the axis. For example, the angle between the tangent to the corresponding circular line and the tangent to the structure at the point of intersection is always the same in the sections at different points. The structures may extend in the sections according to a logarithmic spiral.

For example, the angle is between 20° and 70°, between 30° and 60°, between 40° and 50°, etc.

Further features and aspects of example embodiments of the present invention are described in more detail below with reference to the appended schematic Figures.

DETAILED DESCRIPTION

Figure 1:
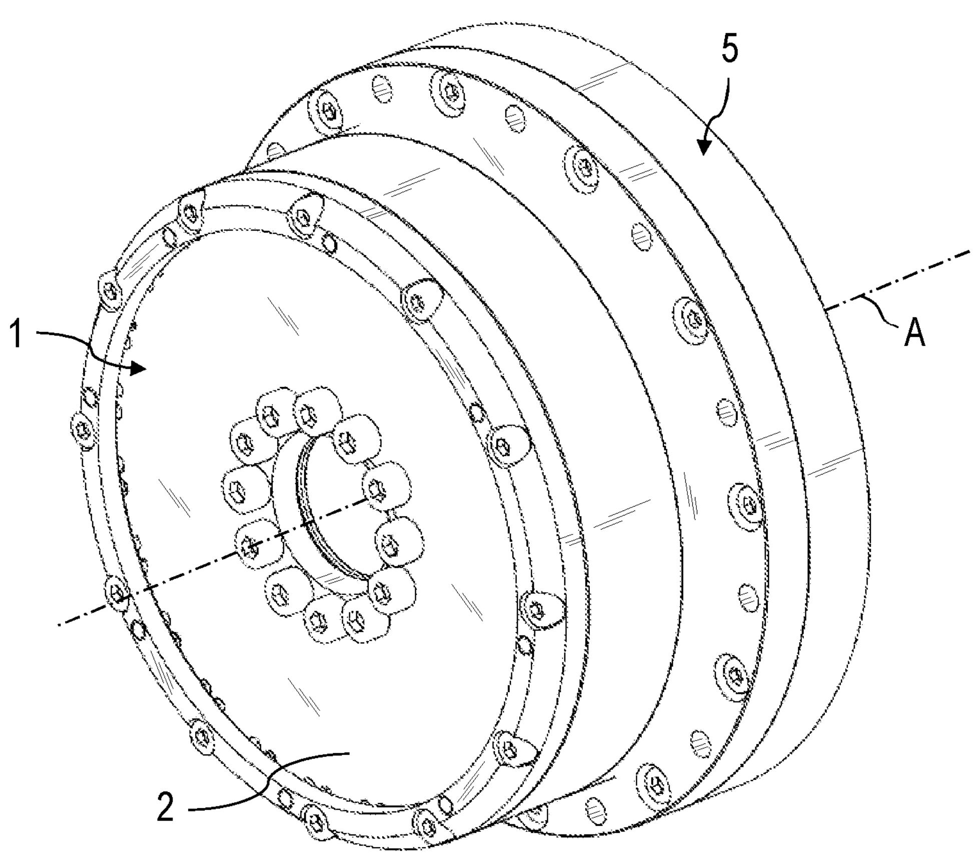
FIG. 1 is a perspective view of a sensor device coupled to a drive unit.

FIG. 1 is a perspective view of a sensor device 1 coupled to a drive unit 5. Such an arrangement is used, for example, in the robot axles of industrial robots. The sensor device 1 is connected to the drive unit 5, and the substrate of the sensor device 1 is coupled or flange-mounted to the drive unit 5. In response to a tangential force being introduced into the sensor device 1 by the drive unit 5, a torque can act on the substrate 2, e.g., causing the sensor device 1 or the substrate 2 to warp slightly. The resulting torque can be detected and processed by the sensor device 1.

Figure 2:
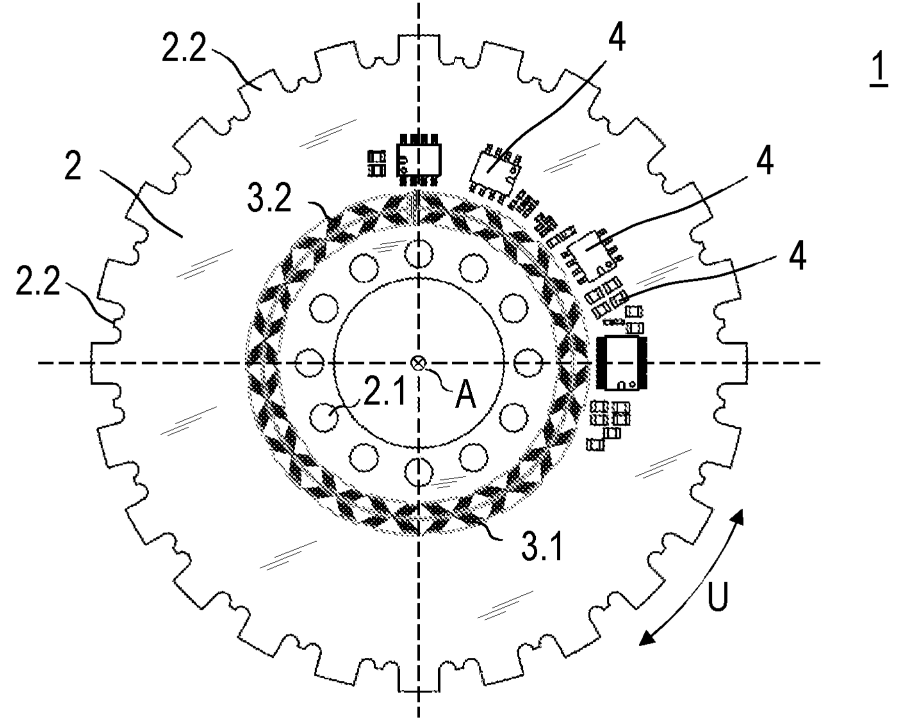
FIG. 2 is a top view of the sensor device.

FIG. 2 is a top view of the sensor device 1. The sensor device 1 includes the substrate 2, which includes or consists of, for example, an epoxy resin (e.g., fiber-reinforced), carbon fiber-reinforced plastic, or a metal, e.g., steel. For fastening purposes, the sensor device 1 or the substrate 2 has bores 2.1 and teeth 2.2, in which the bores 2.1 are arranged along an inner diameter and the teeth 2.2 are arranged along an outer diameter concentrically to the axis A. In this manner, the sensor device 1 can be attached in an anti-swiveling manner to a component, for example, a flange and a hub of a drive unit 5, using screws or rivets. The sensor device 1 also includes first and second conductor tracks 3.1, 3.2, which are applied by an additive technique, e.g., via a photolithography process. If the substrate 2 is made of a metal material, such as steel, an electrically insulating plastic layer, for example, made of polyimide, is provided between the conductor tracks 3.1, 3.2 and the substrate 2.

The sensor device 1 is substantially annular or circular and is arranged centrally in relation to the axis A. In addition, the conductor tracks 3.1, 3.2 are arranged in a plane that is oriented orthogonally to the axis A. For example, the sensor device 1 is configured to be point-symmetrical with respect to a point on the axis A. The structures 3.101-3.132, 3.201-3.232 (see, e.g., FIG. 6) of the first and second conductor tracks 3.1, 3.2 are made of copper or constantan, for example.

The sensor device 1 can be supplied with electrical energy. This can be done via a cable (if the possible number of revolutions is limited), via a slip ring, or wirelessly. When the sensor device 1 is operated, a defined current flows through the sensor device 1. As a result of the torque being passed through the sensor device 1 or the substrate 2, a deformation of the sensor device 1 occurs. Depending on the deformation of the substrate 2 due to a torque load (e.g., a torsional load), a change in the length of the conductor tracks 3.1, 3.2 occurs as a result of local expansion phenomena, e.g., in the structures 3.101-3.132, 3.201-3.232. This, in turn, results in a change in resistance. By utilizing this effect, the sensor device 1 can determine a torque load (e.g., a torsional load) of the substrate 2 about the axis A.

Signals are generated and processed by the electronic components 4 and transmitted to downstream electronics.

Figure 3:
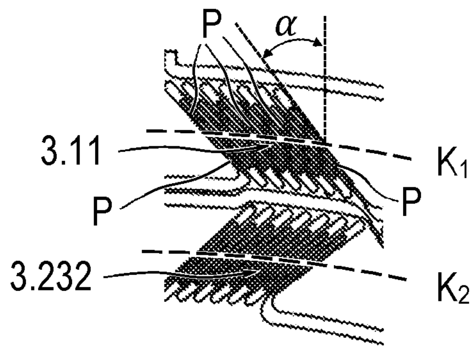
FIG. 3 is an enlarged view of the structures of the sensor device.

As illustrated in FIG. 3, the structures 3.101-3.132, 3.201-3.232 of the conductor tracks 3.1, 3.2 each have a plurality of sections P in which the conductor tracks 3.1, 3.2 are straight. The conductor tracks 3.1, 3.2 intersect one of the circular lines $K_1$, $K_2$ in the sections P such that the center point of each section P or the respective bisector of each section P is always located on the first circular line $K_1$ or on the second circular line $K_2$. For example, the path of the respective straight section P and a straight line extending in the radial direction through the center point of section P includes an angle $\alpha$ having a value of 45°.

Alternatively, the conductor tracks 3.1, 3.2 may also be curved and parallel. According to this arrangement, the conductor tracks 3.1, 3.2 extend along parallel spiral lines in the regions of the sections P, so that, within the sections P, the radius of curvature of the conductor tracks 3.1, 3.2 varies depending on the distance from the axis A. Additionally, the angle $\alpha$ may also be 45°. Consequently, the conductor tracks 3.1, 3.2 extend in the sections P according to the laws of two logarithmic spirals. Each tangent to one of the circular lines $K_1$, $K_2$ always intersects one of the logarithmic spirals at the same angle $\alpha$ (isogonal trajectories), and this property applies to any circular lines with different radii whose common center point M is located on the axis A. For example, the conductor tracks 3.1, 3.2 thus also extend in the sections P according to equiangular spirals.

Figure 4:
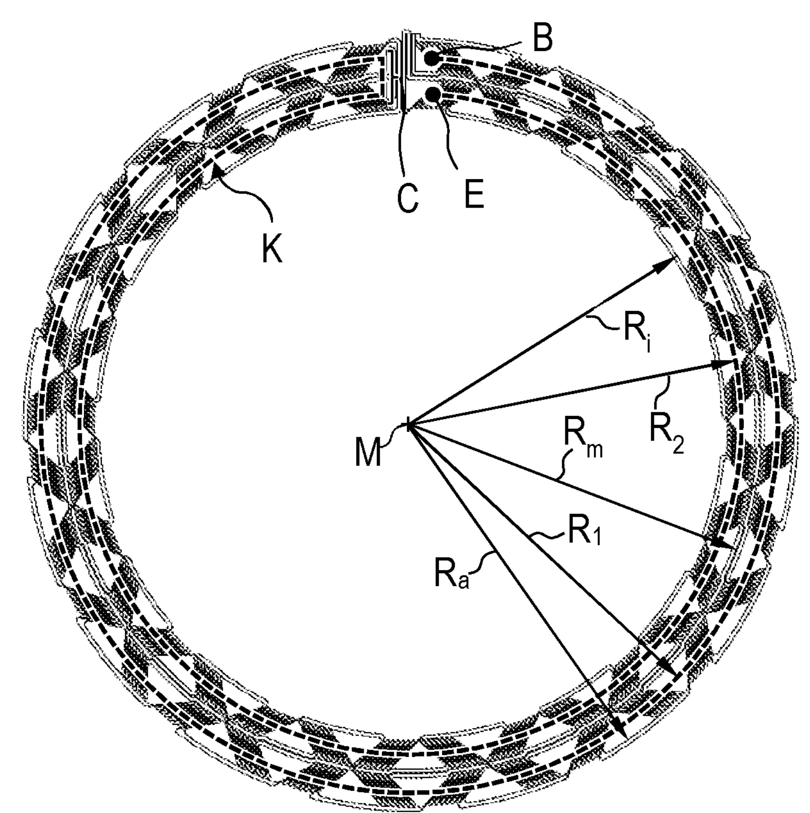
FIG. 4 illustrates the structures of a sensor device.

The conductor tracks 3.1, 3.2 include a plurality of structures 3.101-3.132, 3.201-3.232 arranged in an alternating manner along a curve K. As illustrated in FIG. 4, the curve K has its origin at a first point B on the first circular line $K_1$ and initially extends along the first circular line $K_1$ and merges into the second circular line $K_2$ in a transition region C without interruption. The curve K continues along the circular line $K_2$ and ends at a second point E. Starting at the first point B, a structure 3.11 of the first conductor track 3.1 is followed by a structure 3.21 of the second conductor track 3.2 and so on along the curve K until the second point E is reached. No structures 3.101-3.132, 3.201-3.232 are present in the transition region C. The first circular line $K_1$ has its center point M on the axis A and has the radius $R_1$. The second circular line $K_2$ also has its center point M on the axis A and has the radius $R_2$. Both circular lines $K_1$, $K_2$ are arranged concentrically about the center point M, and the following relationship is satisfied: $R_2 < R_1$.

Figure 5:
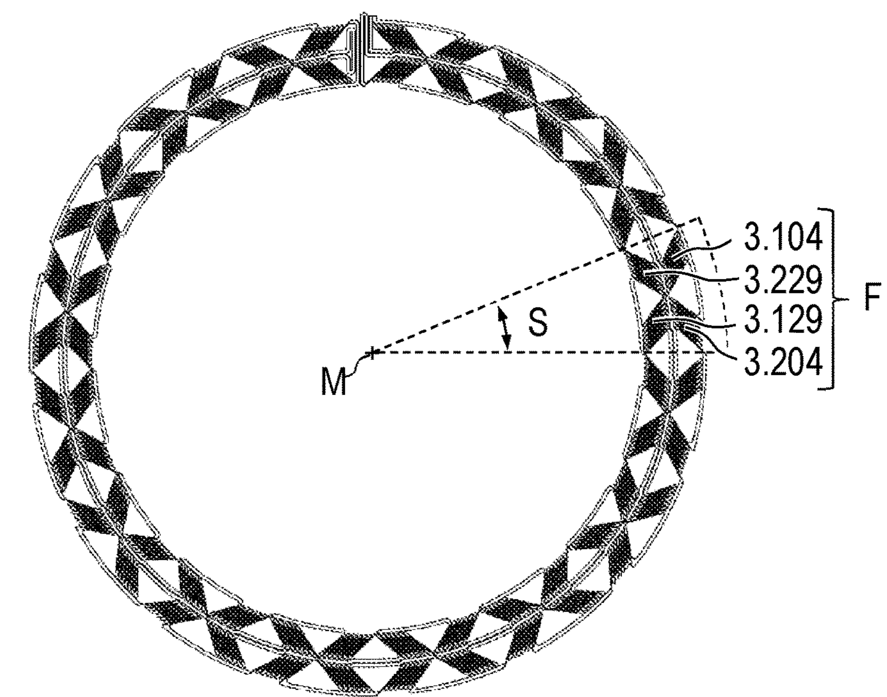
FIG. 5 illustrates the structures and the formation in a circular sector of a sensor device.
Figure 6:
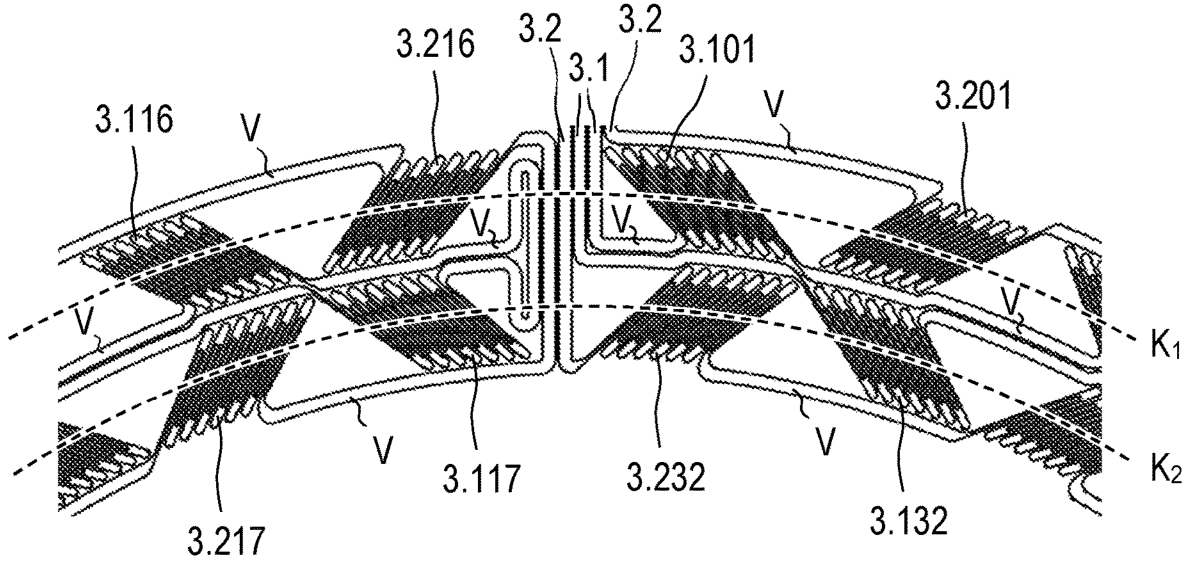
FIG. 6 illustrates a portion of the structures illustrated in FIG. 5.

As illustrated in FIGS. 5 and 6, the structures 3.101-3.132, 3.201-3.232 of the first and second conductor tracks 3.1, 3.2 are arranged such that four adjacent structures are located within a circular sector S. The four adjacent structures 3.104, 3.129, 3.204, 3.229 include the two structures 3.104, 3.129 of the first conductor track 3.1 and the two structures 3.204, 3.229 of the second conductor track 3.2, and the four adjacent structures 3.104, 3.129, 3.204, 3.229 together form an X-shaped formation F. The structures 3.104, 3.129 or 3.204, 3.229 of an identical conductor track 3.1, 3.2 are arranged diagonally opposite each other within a formation F. The formation F illustrated in FIG. 5 occurs a total of 16 times distributed over 360° and extends concentrically and approximately equally distributed along a circular line with the center point M.

FIG. 6 is an enlarged view of the structures illustrated in FIG. 5. The arrangement of the structures 3.101-3.132, 3.201-3.232 of the first and second conductor tracks 3.1, 3.2 is X-shaped. The structures 3.101-3.132, 3.201-3.232 of the first and second conductor tracks 3.1, 3.2 are arranged symmetrically, with a mirror or axial symmetry with respect to the adjacent structures 3.101-3.132, 3.201-3.232 along the first circular line $K_1$ and the second circular line $K_2$. In addition, the structures 3.101-3.132 of the first conductor track 3.1 and the structures 3.201-3.232 of the second conductor track 3.2 alternate along the first circular line $K_1$ and the second circular line $K_2$ with regard to their affiliation to the first and second conductor tracks 3.1, 3.2 and the angle $\alpha$. For example, the structures 3.101-3.132 of the first conductor track 3.1 along the first circular line $K_1$ have the angle $\alpha_1=45°$, and the structures 3.201-3.232 of the second conductor track 3.2 along the first circular line $K_1$ have the angle $\alpha_2=-45°$. The individual structures 3.101-3.132, 3.201-3.232 of a conductor track 3.1, 3.2 begin and end in a connecting section V, which may be arranged differently with regard to length and shape. For example, the first conductor track 3.1 and the second conductor track 3.2 extend in the connecting sections V in the circumferential direction. The path of the second conductor track 3.2 is arranged such that it encloses the first conductor track 3.1 over the entire circumference of the substrate 2, i.e., the connecting sections V of the second conductor track 3.2 are arranged on the outside of the substrate 2, i.e., along a circular line with the outer radius $R_a$ and a circular line with the inner radius $R_i$, whereas the connecting sections V of the first conductor track 3.1 are arranged on the inside, i.e., along a circular line with the center radius $R_m$. The path of the first and second conductor tracks 3.1, 3.2 is always without interruption, both with regard to the outgoing and the returning path.

The connecting sections V and the structures 3.101-3.132 of the first conductor track 3.1 and the connecting sections V and the structures 3.201-3.232 of the second conductor track 3.2 are approximately the same length in total and have approximately the same resistance. On the outgoing path, the connecting sections V of the second conductor track 3.2 extend on the outside of the substrate 2, i.e., along a circular line with an outer radius $R_a$, and on the returning path, they extend along a circular line with an inner radius $R_i$. Both on the outgoing and returning path, the connecting sections V of the first conductor track 3.1 extend on the inside of the substrate 2, i.e., along a circular line with the center radius $R_m$, between the structures 3.101-3.132, 3.201-3.232 of the first and second conductor tracks 3.2, 3.1. The following relationship is satisfied: $R_i+R_a=2\cdot R_m$. The foregoing provides for uniform temperature application to the first and second conductor tracks 3.1, 3.2 in a single-layer structure, as both the structures 3.101-3.132, 3.201-3.232 of the first and second conductor tracks 3.1, 3.2 and the connecting sections V are on average located on a circular line with an identical radius. As a result, the first and second conductor tracks 3.1, 3.2 have the same average temperature on the substrate 2, even with temperature gradients from the inside to the outside. Due to the multiple arrangement of the structures 3.101-3.132, 3.201-3.232 distributed over the circumference U of the substrate 2 parasitic influences can also be better compensated for by utilizing symmetry effects.

LIST OF REFERENCE CHARACTERS

1 Sensor device
2 Substrate
2.1 First means
2.2 Second means
3.1 First conductor track
3.101-3.132 Structures of the first conductor track
3.2 Second conductor track
3.201-3.232 Structures of the second conductor track
4 Electronic component
5 Drive unit
A Axis
U Circumferential direction
K Curve
$K_1$ First circular line
$K_2$ Second circular line
M Center point
$R_1$ First radius
$R_2$ Second radius
$R_a$ Outer radius
$R_i$ Inner radius
$R_m$ Center radius
B First point
E Second point
C Transition region
V Connecting section
S Circular sector
F Formation
P Section
$\alpha$ Angle $\alpha$

What is claimed is:

1. A sensor device for torque measurement, comprising:
a substrate;
a first conductor track arranged on the substrate and including meander-shaped structures that are connected to each other via connecting sections; and
a second conductor track arranged on the substrate and including meander-shaped structures that are connected to each other via connecting sections;
wherein the sensor device is adapted to determine a torque load of the substrate;
wherein the structures of the first conductor track and the structures of the second conductor track are arranged alternatingly along a curve; and
wherein the curve is arranged on an outgoing path, from an origin in a circumferential direction, without interruption and at least in sections along a first circular line and is arranged on a returning path, to the origin in the circumferential direction, at least in sections along a second circular line.

2. The sensor device according to claim 1, wherein the meander-shaped structures of the first conductor track and the meander-shaped structures of the second conductor track include a plurality of loops aligned in parallel.

3. The sensor device according to claim 1, wherein each of the first circular line and the second circular line is located concentrically to a center point and in a circumferential direction of the substrate.

4. The sensor device according to claim 1, wherein the substrate is rotatable about an axis that extends through a center point of the substrate and/or is warpable in a circumferential direction of the substrate.

5. The sensor device according to claim 1, wherein the structures of the first conductor track and of the second conductor track are arranged symmetrically to each other.

6. The sensor device according to claim 1, wherein, in a circular sector, adjacent structures of the first conductor track and of the second conductor track are arranged in an X-shaped or diamond-shaped formation.

7. The sensor device according to claim 1, wherein the second conductor track encloses the first conductor track.

8. The sensor device according to claim 1, wherein the first conductor track and second conductor track are arranged as additive structures on the substrate.

9. The sensor according to claim 1, wherein the substrate includes a bore and/or evenly or unevenly distributed teeth, prong, and/or tines adapted to introduce the torque load and a bore and/or evenly or unevenly distributed teeth, prong, and/or tines adapted to release the torque load.

10. The sensor device according to claim 1, wherein the sensor device is adapted to determine the torque load by determining a resistance of the first conductor track and/or the second conductor track.

11. The sensor device according to claim 1, wherein the first conductor track and second conductor track include an identical number of structures connected according to a bridge circuit.

12. The sensor device according claim 1, further comprising at least one electronic component arranged on the substrate and adapted to process signals generated by the first conductor track and/or by the second conductor track.

13. The sensor device according to claim 1, wherein each of the structures have a plurality of sections in which the conductor tracks are curved in parallel with a radius of curvature that varies depending on distance from an axis about which the substrate is rotatable.

14. The sensor device according to claim 1, wherein, on the outgoing path, the connecting sections of the second conductor track are located along a circular line with an outer radius, and, on the returning path, the connecting sections of the second conductor track are located along a circular line with an inner radius, and wherein, both on the outgoing and returning path, the connecting sections of the first conductor track are located along a circular line with a middle radius, the following relationship being satisfied: $R_i+R_a=2 \cdot R_m$;

$R_i$ representing the inner radius, $R_a$ representing the outer radius, $R_m$ representing the middle radius.

15. The sensor device according to claim 1, wherein the substrate includes at least one first structure adapted to introduce the torque load and at least one second structure adapted to release the torque load.

16. The sensor device according to claim 15, wherein the at least one first structure includes at least one bore, and the at least one second structure includes at least one tooth.

17. The sensor device according to claim 1, wherein the substrate and the conductor tracks are made of metal.

18. The sensor device according to claim 17, wherein the substrate and the conductor tracks are made of different metals.

19. The sensor device according to claim 1, wherein each of the structures have a plurality of sections in which the conductor tracks are straight or curved in parallel.

20. The sensor device according to claim 19, wherein the structures intersect one of the circular lines in the sections at an angle that is identical in magnitude.

21. The sensor device according to claim 20, wherein the magnitude of the angle is between 20° and 70°.

22. A sensor device for torque measurement, comprising:

a substrate;

a first conductor track arranged on the substrate and including zig-zag-shaped structures that are connected to each other via connecting sections; and a second conductor track arranged on the substrate and including zig-zag-shaped structures that are connected to each other via connecting sections;

wherein the sensor device is adapted to determine a torque load of the substrate;

wherein the structures of the first conductor track and the structures of the second conductor track are arranged alternatingly along a curve; and wherein the curve is arranged on an outgoing path, from an origin in a circumferential direction, without interruption and at least in sections along a first circular line and is arranged on a returning path, to the origin in the circumferential direction, at least in sections along a second circular line.

* * * * *